US007716798B2

(12) United States Patent
Simms

(10) Patent No.: US 7,716,798 B2
(45) Date of Patent: May 18, 2010

(54) REPLACING A VALVE SEAT OF AN AIRLESS PAINT SPRAY GUN

(76) Inventor: Joseph Simms, 2570 W. Calle Senor Manuel, Tucson, AZ (US) 85741

( * ) Notice: Subject to any disclaimer, the term of this patent is extended or adjusted under 35 U.S.C. 154(b) by 872 days.

(21) Appl. No.: 11/355,295

(22) Filed: Feb. 14, 2006

(65) Prior Publication Data

US 2006/0180683 A1 Aug. 17, 2006

(51) Int. Cl.
*B23P 19/04* (2006.01)

(52) U.S. Cl. ............................ 29/213.1; 81/427; 7/158

(58) Field of Classification Search ..................... 239/1, 239/600, DIG. 14, 290–301; 81/415, 423, 81/158, 9.4, 427; 29/213.1; 7/158
See application file for complete search history.

(56) References Cited

U.S. PATENT DOCUMENTS 4,607,548 A * 8/1986 Anderson .................... 81/427
6,205,892 B1 * 3/2001 Davidson ..................... 81/128
7,174,590 B1 * 2/2007 Quenzi .......................... 7/158

* cited by examiner

*Primary Examiner*—Davis Hwu
(74) *Attorney, Agent, or Firm*—Thrasher Associates

(57) ABSTRACT

The invention teaches using a generally cylindrical replacement tool and multifunction tool to replace a valve seat of a airless spray gun. It is emphasized that this abstract is provided to comply with the rules requiring an abstract that will allow a searcher or other reader to quickly ascertain the subject matter of the technical disclosure. It is submitted with the understanding that it will not be used to interpret or limit the scope or meaning of the claims. 37 CFR 1.72(b).

4 Claims, 1 Drawing Sheet

FIG 2b
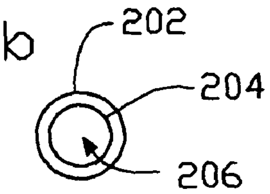
FIG 1a
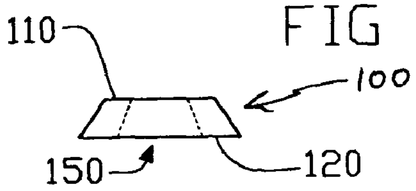
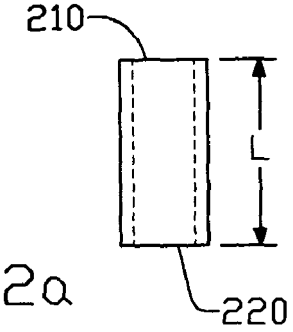
FIG 2a
FIG 1b
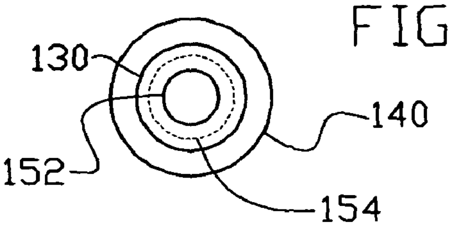
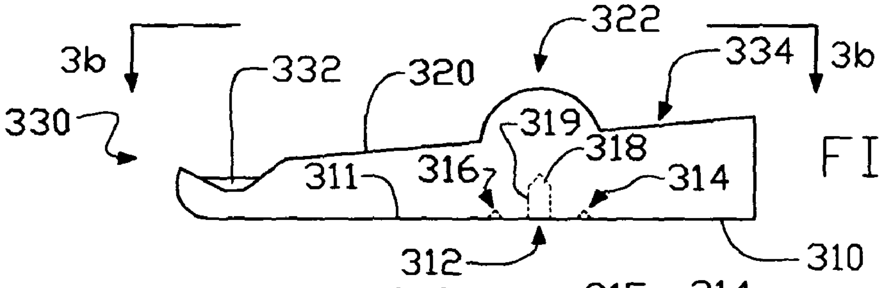
FIG 3a
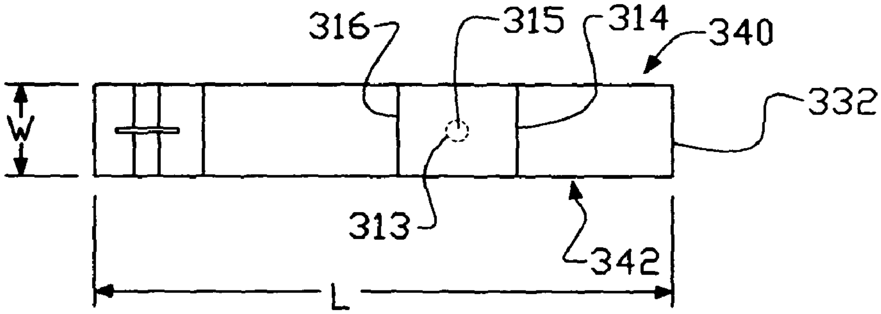
FIG 3b

REPLACING A VALVE SEAT OF AN AIRLESS PAINT SPRAY GUN

TECHNICAL FIELD OF THE INVENTION

The invention relates generally to airless spray guns, such as airless paint spray guns.

PROBLEM STATEMENT

Interpretation Considerations

This section describes the technical field in more detail, and discusses problems encountered in the technical field. This section does not describe prior art as defined for purposes of anticipation or obviousness under 35 U.S.C. section 102 or 35 U.S.C. section 103. Thus, nothing stated in the Problem Statement is to be construed as prior art.

Discussion

Spray guns typically evenly distribute a liquid or jell as droplets over a predefined area, and have become mainstays for professionals, such as paint professionals, and "do-it-your-selfers." Because spray guns provide for a much more rapid application of paint over a given area, they are now commonly used in practically all painting environments, including construction, home improvement, automobile, and industry.

Paint spray guns are typically categorized as either "air" or "airless." Airless spray guns place paint under high pressure to achieve atomization, while paint spray guns that use air typically use a lower pressure, but are more commonly used in the do-it-yourself markets.

Although a great many varieties of airless spray guns are known, a brief overview of airless spray guns is germane to the present patent application. An airless spray gun typically has a handgrip resembling that of a handgun. The handgrip is provided with a barrel, and a bar-like or rod-like valve element is reciprocable in the barrel. A trigger on the handgrip serves to displace the valve element. The handgrip is further provided with a conduit which can be connected to a source of pressurized paint and opens into the barrel. The valve element reciprocates between a retracted position and an extended position. In the extended position, the valve element contacts a valve seat formed on a seating member which is typically screwed into the barrel. The seating member has an outlet opening which is sealed when the valve element lies against the valve seat and is open when the valve element is retracted. The outlet opening is located inside a cap or housing which is typically screwed into the barrel. The outlet opening faces a dividing or diffusing member which is held in place by the cap and is provided with a head having several flow channels. The head is confined in a hollow nut which is screwed onto the cap. Paint issuing from the outlet opening enters the flow channels where it is divided into a number of streams and leaves the gun as a spray.

Additionally, U.S. Pat. No. 3,780,953 (1973) discloses an exemplary airless spray gun that includes a trigger locking assembly for preventing the actuation of the spray gun as desired, a valve rod, and means for detachably mounting the same in the gun which permits rapid assembly and disassembly of the gun. An improved valve seat is also disclosed which substantially reduces the cost of manufacturing the same. Airless spray guns, however, are not without problems.

The valve seat on which the valve element rests in its extended position undergoes wear. When the amount of wear becomes excessive, the valve element can no longer form a satisfactory seal with the valve seat and the valve seat or the seating element containing the valve seat must be replaced. Typically, the seating element consists of a nut, and a hollow stub which extends from one of the major sides of the nut. The nut contains the outlet opening and the seat while the hollow stub is provided with external threads adapted to mesh with internal threads on the barrel. Replacement of the seat is difficult and time consuming. Accordingly, there is a need for a device and methodology that facilitates replacement of a valve seat for an airless spray gun.

BRIEF DESCRIPTION OF THE DRAWINGS

Various aspects of the invention, as well as an embodiment, are better understood by reference to the following detailed description. To better understand the invention, the detailed description should be read in conjunction with the drawings, in which like numerals represent like elements unless otherwise stated.

FIGS. 1*a* and 1*b* illustrate a replacement valve seat.

FIGS. 2*a* and 2*b* shows a replacement tool.

FIGS. 3*a* and 3*b* illustrate a multifunction tool.

EXEMPLARY EMBODIMENT OF A BEST MODE

Interpretation Considerations

When reading this section (An Exemplary Embodiment of a Best Mode, which describes an exemplary embodiment of the best mode of the invention, hereinafter "exemplary embodiment"), one should keep in mind several points. First, the following exemplary embodiment is what the inventor believes to be the best mode for practicing the invention at the time this patent was filed. Thus, since one of ordinary skill in the art may recognize from the following exemplary embodiment that substantially equivalent structures or substantially equivalent acts may be used to achieve the same results in exactly the same way, or to achieve the same results in a not dissimilar way, the following exemplary embodiment should not be interpreted as limiting the invention to one embodiment.

Likewise, individual aspects (sometimes called species) of the invention are provided as examples, and, accordingly, one of ordinary skill in the art may recognize from a following exemplary structure (or a following exemplary act) that a substantially equivalent structure or substantially equivalent act may be used to either achieve the same results in substantially the same way, or to achieve the same results in a not dissimilar way.

Accordingly, the discussion of a species (or a specific item) invokes the genus (the class of items) to which that species belongs as well as related species in that genus. Likewise, the recitation of a genus invokes the species known in the art. Furthermore, it is recognized that as technology develops, a number of additional alternatives to achieve an aspect of the invention may arise. Such advances are hereby incorporated within their respective genus, and should be recognized as being functionally equivalent or structurally equivalent to the aspect shown or described.

Second, the only essential aspects of the invention are identified by the claims. Thus, aspects of the invention, including elements, acts, functions, and relationships (shown or described) should not be interpreted as being essential unless they are explicitly described and identified as being essential. Third, a function or an act should be interpreted as incorporating all modes of doing that function or act, unless otherwise explicitly stated (for example, one recognizes that "tacking" may be done by nailing, stapling, gluing, hot gunning, riveting, etc., and so a use of the word tacking invokes stapling, gluing, etc., and all other modes of that word and similar words, such as "attaching").

Fourth, unless explicitly stated otherwise, conjunctive words (such as "or", "and", "including", or "comprising" for example) should be interpreted in the inclusive, not the exclusive, sense. Fifth, the words "means" and "step" are provided to facilitate the reader's understanding of the invention and do not mean "means" or "step" as defined in §112, paragraph 6 of 35 U.S.C., unless used as "means for -functioning-" or "step for -functioning-" in the Claims section. Sixth, the invention is also described in view of the Festo decisions, and, in that regard, the claims and the invention incorporate equivalents known, unknown, foreseeable, and unforeseeable. Seventh, the language and each word used in the invention should be given the ordinary interpretation of the language and the word, unless indicated otherwise.

Of course, the foregoing discussions and definitions are provided for clarification purposes and are not limiting. Words and phrases are to be given their ordinary plain meaning unless indicated otherwise.

Description of the Drawings

FIGS. 1*a* and 1*b* illustrate a replacement valve seat 100. Replacement seats in general are in the form of a washer or an annular disk having a central opening. The replacement valve seat (the replacement seat) 100 described herein preferably comprises a discrete part from a valve element, although in other embodiments the valve seat 100 may be coupled to the valve element. The replacement seat 100 has a planar top 110 and a planar bottom 120, the top 110 being generally parallel to the bottom 120. The top 110 is generally round, and has a top exterior diameter 130. Similarly, the bottom 120 is also generally round, and has a bottom exterior diameter 140 that is typically larger than the top exterior diameter 130.

The replacement seat 100 has a generally central opening 150. The opening 150 is generally annular and includes a generally circular top opening 152 that tapers to a generally round bottom opening 154. Preferably, there is a constant tapering outward from the top opening 152 and to the bottom opening 154, however, other tapering may be developed and used.

The diameter of the replacement seat 100 is slightly smaller than the diameter of the chamber of the seating member for a corresponding spray gun. The replacement seat 100 is sized to be located in the chamber adjacent to the outlet opening with the central opening 150 of the replacement seat in register with the opening. Accordingly, the diameters/circumferences of the top 110 and bottom 120 vary depending on the specific air gun the replacement seat 100 is to fit in.

The airless spray gun elements referred to herein are very well known in the art of airless spray guns and need no particular elaboration for understanding by one of skill in the art. Of note, the replacement seat 100 may be made of any variety of materials, such as plastics, rubber, nylon, Teflon®, or carbon fiber, for example.

FIGS. 2*a* and 2*b* shows a replacement tool 200 that is used to replace a spray gun replacement valve 100 that incorporates a nut. As shown, the replacement tool 200 is cylindrical, having a circular perpendicular cross-section. The replacement tool 200 has a length L, which is preferably ½ inch or more in length, being sufficiently long enough to allow a user to easily place the replacement seat 100 in the spray gun. Additionally, the tool 200 has an exterior circumference 202 that is larger than the hole 150, and interior circumference 204 defining a hollow interior portion 206. The circumferences 202, 204 correspond to the replacement valve and nut they are to replace (provided, however, that the circumferences 202, 204 may vary so long as they are not too large or too small such that they damage the replacement seat being replaced). The replacement tool 200 includes a generally planar top 210 and a generally planar bottom 220, the top 210 being generally parallel to the bottom 220. However, when performing the method according to the invention, any functionally equivalent tool may be used without departing from the invention.

FIGS. 3*a* and 3*b* illustrate a multifunction tool 300 having an emitter punch, FIG. 3*b* being taken along cut line A-A of FIG. 3*a*. The multifunction tool (tool) 300 allows for quick and easy installation of the valve seat 100. The tool 300 comprises a seating grip 310 and a grasping grip 320 that are coupled via an end 330 that preferably maintains a spring force that separates the seating grip 310 and the grasping grip 320 when at rest.

In one embodiment, the grips 310, 320 are coupled as a single mold-form during construction of the tool 300, and are similar length and width. However, any manner of coupling the grips 310, 320 together lies within the scope of the claims, and no specific width or length is preferred, although it is also preferred that the width be sufficiently small to enable the tool 300 to be held in the hand of a user while still performing the function of replacing a valve seat. Likewise, the length of the seating grip 310 should be sufficiently small to make the handgrip easily used by a user, thus providing for grips 310, 320 ranging between three and eight inches in length, while having a preferred length of approximately four inches. The width W of the grips 310, 320 is sufficient to hold the replacement valve 100, while being easily held in a user's hand, and in one embodiment is approximately ¾ of an inch. Additionally, it is preferred that the end 330 comprises a razor blade 332, or other cutting means, that is embedded and rigidly affixed within the end 330. The razor blade 332 should include a safety system for insuring that a user is not harmed while replacing a valve seat. In practice, a supply tubing (typically either ⅝ inch or ½ inch supply tubing) is cut with the blade 332. And, of course, it should also be understood that additional functional structural elements may be incorporated in the end 330, and such structural elements lie within the scope of the invention.

The seating grip 310 comprises the portion of the tool from the end 330 to a first end 330 which terminates approximately four-inches from the end 330, and has a first edge 340 and a second edge 342 (together, edges 340, 342). Of course, the seating grip 310 may be longer or shorter. The seating grip 310 comprises a replacement seat setting 312 which comprises an emitter line punch (emitter punch) that doubles as a seat setting, and a system for securing a valve seat, such as secure ridges.

Preferably, the setting 312 allows a ½ inch line that a hole is punched into to reseal. The replacement seat setting 312 preferably includes a tip portion 318 that is shaped to take the tapered shape of a corresponding valve seat central opening 150. Accordingly, the seat setting 312 top portion 318 comprises a generally conical cross-sectional shape and includes a generally circular base 313 that tapers to a tip 315. Of course, the tip 315 may be flat at some portion, however, a pointed tip 315 (shown) has advantages readily understood by those of skill in the art upon reading this disclosure. As shown, the tip 315 may be raised above the base 313 via a columnar shaft portion 317 that raises the base 313 of the tip setting 312 above the seating grip 310, preferably as a columnar element having a diameter equal to that of the base 313 extending from the base 313 to the seating grip 310.

Preferably, there is a constant tapering between the base 313 the tip 315, however, other tapering may be developed and used so long as a valve seat may be snugly accommodated thereon. For example, the replacement seat setting 312 may comprise an elongated base 313 that is substantially cylindrical to form a shaft portion that allows for better emitter punch functionality. The cylindrical portion 317 is preferably approximately ½ inch in height, and the base is preferably ⅛ inch in diameter.

The seating grip 310 also includes a first secure ridge 314 and a second secure ridge 316. Each secure ridge 314, 316 comprises a small rise above an interior 311 of the seating grip 310 that traverses the length of the seating grip 310 perpendicular to the edges of the seating grip length, L. Of course, the ridges 314, 316 need not be continuous, and intermittent ridges are considered functionally equivalent. Functionally, the ridges 314, 316 allow a valve seat to sit upon the setting 312 without excessive slipping.

The grasping grip 320 comprises the portion of the tool from the end 330 to a second end 334 which terminates approximately four-inches from the end 330. Likewise, the length of the grasping grip 320 should be sufficiently small to make the handgrip easily used by a user, thus providing for a length ranging between three and eight inches in length, while having a preferred length of approximately four inches. Of course, the grasping grip 320 may be longer or shorter so long as the grasping grip 320 comprise a gripper 322. The gripper 322 is any element that allows clearance for the insertion of a valve element into the appropriate component of a corresponding spray gun. Here, the gripper 322 is integral with the grasping grip 320, is curved concave relative to the interior 311, and is located opposite of the replacement seat setting 312. Of course, the gripper 322 is preferably sized to accept a corresponding valve element in a configuration that provides for application of a replacement valve to the valve element.

Methodology

Having thus described the structural aspects of the invention, the use of the invention is readily apparent to those of skill in the art upon reading the present disclosure. Of note, it is preferred to engage the spray gun trigger while removing the used valve seat. The replacement seat 100 is preferably inserted in the chamber of the seating member of a spray gun so that the replacement seat abuts the nut-like section and the central opening 150 of the replacement seat 100 is aligned with the outlet opening of the spray gun. When the replacement seat 100 is properly positioned in the chamber of an air gun, the replacement seat 100 bears against the side of the nut-like section that faces the barrel of the spray gun. The replacement seat 100 can later be removed from the chamber and replaced by another replacement seat.

The seating member of the spray gun is then screwed into the barrel of the spray gun. Once the seating member as been seated on the barrel, the intermediate cap is screwed onto the barrel. The shaft and the diffusing member are now inserted in the extension of the intermediate cap, and the end cap is thereupon screwed onto the cylindrical section of the cap. Following assembly of the spray gun, the spray gun may be used as normal.

Though the invention has been described with respect to a specific preferred embodiment, many variations and modifications (including equivalents) will become apparent to those skilled in the art upon reading the present application. It is therefore the intention that the appended claims and their equivalents be interpreted as broadly as possible in view of the prior art to include all such variations and modifications.

I claim:

1. A method of replacing a valve seat in an airless spray gun, comprising:

releasing pressure from an airless paint gun and an airless paint gun line;

disassembling the airless paint gun having an original valve seat therein;

cleaning a diffuser nut;

removing the original valve seat;

inserting a replacement valve seat into the airless paint gun, the replacement valve seat comprising an annular disk having a central opening;

using a multifunction tool to properly seat the replacement valve, the multifunction tool comprising a seating grip and a grasping grip that accommodate a hand;

the seating grip and the grasping grip coupled together at an end, the end accommodating a razor;

the seating grip comprising a replacement seat setting that accommodates a valve seat of an airless spray gun, replacement seat setting comprises a first secure ridge and a second secure ridge, each of the first secure ridge and the second secure ridge perpendicularly traverse the edges of the seating grip, the first secure ridge and the second ridge being spaced apart to accommodate a replacement airless air gun valve therebetween, a shaft portion and a tip that allows the replacement seat setting to function as an emitter punch, the tip located between the first secured ridge and the second secured ridge the grasping grip comprises a gripper, the gripper adapted to accommodate a valve element; and reassembling the airless paint gun.

2. The tool of claim 1 wherein the seating grip has a length of at least four inches.

3. The tool of claim 1 wherein the seating grip has a width of at least ½ inch.

4. An airless spray gun multifunction tool, comprising:

a seating grip and a grasping grip that accommodate a hand;

the seating grip and the grasping grip coupled together at an end, the end accommodating a razor;

the seating grip comprising a replacement seat setting that accommodates a valve seat of an airless spray gun, replacement seat setting comprises a first secure ridge and a second secure ridge, each of the first secure ridge and the second secure ridge perpendicularly traverse the edges of the seating grip, the first secure ridge and the second ridge being spaced apart to accommodate a replacement airless air gun valve therebetween, a shaft portion and a tip that allows the replacement seat setting to function as an emitter punch, the tip located between the first secured ridge and the second secured ridge; and the grasping grip comprises a gripper, the gripper adapted to accommodate a valve element.

* * * * *